Inventor
G. S. Stanley

Patented June 11, 1935

2,004,449

UNITED STATES PATENT OFFICE 2,004,449

DISH

George S. Stanley, Winnipeg, Manitoba, Canada

Application March 30, 1934, Serial No. 718,270
In Canada January 7, 1935

3 Claims. (Cl. 229—43)

The invention relates to improvements in a dish, particularly designed for containing food products for human consumption and an object of the invention is to provide a closed dish of neat and pleasing appearance and through which the contained food product is clearly visible and in which the food product is kept free from dust, dirt and the like, the whole arrangement acting to entice a person to buy the product.

A further object is to provide the dish having the above features which is also light, non-breakable and washable and lends itself readily to the effective display of the contained product.

A further object is to provide a transparent dish with a transparent cover which latter can be easily and quickly closed or opened and when closed virtually seals the dish and wherein the closing or opening movement of the cover is permitted by a flexing movement of the dish body.

A further and more detailed object of the invention is to provide a dish body and a dish cover both made from a relatively stiff yet flexible transparent and light material such as celluloid, "cellophane" or the like and to provide the rim of the dish with an out turned flange and the cover with a hooked edge passing for the greater part therearound and adapted to be engaged with the flange by a flexing movement of the sides of the dish body.

With the above more important objects in view, the invention consists essentially in the arrangement and construction of parts hereinafter more particularly described, reference being had to the accompanying drawing, in which:—

In the drawing like characters of reference indicate corresponding parts in the different figures.

Figure 1:
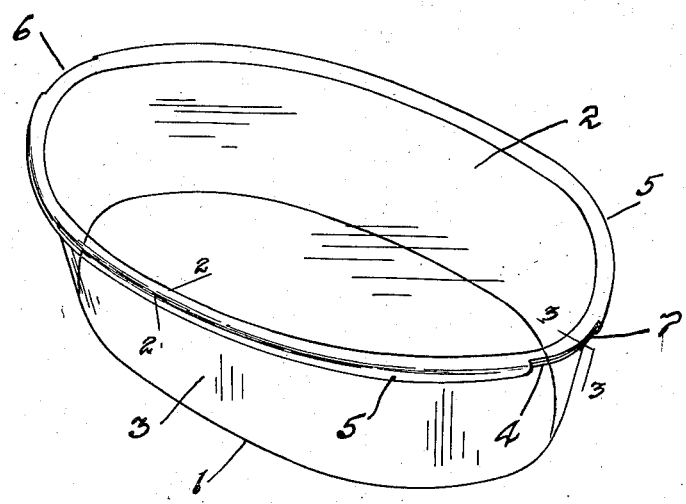
Fig. 1 is a perspective view of the complete dish, the cover being in closed position.
Figures 2, 3:
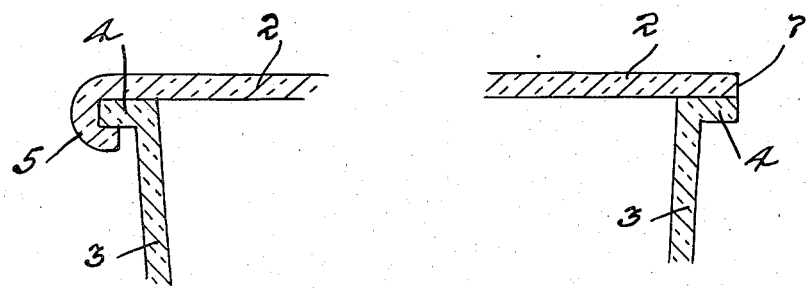
Fig. 2 is an enlarged detailed vertical cross-sectional view at 2—2 Figure 1.
Fig. 3 is an enlarged detailed vertical cross-sectional view at 3—3 Figure 1.

For selling purposes, I have found that it is very desirable to have the food product to be sold contained in a dish which has not only a neat and pleasing appearance but also permits the contained food to be seen therethrough and virtually seals the food so that dust, dirt, and other foreign material cannot contaminate the same. Further than this, it is desirable from the standpoint of the shopman that the dish be relatively light and non-breakable and arranged so that the cover can be easily and quickly applied or removed without materially disturbing the contents.

The dish which I have provided has the body 1 and the cover 2 both formed from a relatively stiff yet flexible, comparatively light and transparent material such as celluloid or "cellophane". The sides 3 of the dish are slightly out-flared as shown and I have found that an oval shaped dish is very pleasing in appearance and serves my purpose to advantage.

The rim of the dish is supplied with a continuous, horizontal lying, out-turned, relatively narrow flange 4 and the cover has its marginal edge for the greater part hooked as indicated at 5 to receive the flange. It will here be observed, however, that the hook is omitted as indicated at 6 and 7 at the ends of the cover. When the cover is in closed position, it contacts all around with the flange 4 and the hooked sides of the cover effectively hold the cover tightly in place as they snugly receive the flange. This insures that dust, dirt and so forth is excluded positively from the food product contained in the dish.

The cover is applied on the dish by first catching one of the hooked sides thereof on the flange at one side of the dish, then pressing the cover towards the dish and at the same time, squeezing the sides of the dish inwardly an amount sufficient to let the other hooked edge of the cover receive the flange at the other side of the dish. The slight squeezing against the sides of the dish causes the ends thereof to extend slightly but as there are no hooks at the end of the cover, the extending movement of the dish ends is not interfered with.

Obviously as soon as the cover of the dish has been seated on the flange all around, the sides of the dish can be released to expand to their normal position and the cover will be at such time very effectively secured to the dish body and is held in very close or tight contact therewith all around.

The removal of the cover is the same operation, one first squeezing the sides of the dish inwardly to release the flange at one side thereof from the hook of the cover. Thereafter that side of the cover is raised and the cover is then given a lateral movement to clear the other hooked side from the flange.

The dish is particularly desirable for containing and serving foods such as jellies, jellied meat or jellied fish but of course can be utilized to contain any food product which is desired to present to the purchaser in a sanitary, pleasing and inviting condition.

What I claim as my invention is:—

1. A dish for containing and displaying a food product comprising a body and a cover therefor, both made from a relatively thin resilient material and having the body portion provided at its rim with an out-turned flange and the cover with a hooked edge, the said hooked edge being provided with a plurality of flange-extension points thereupon and adapted to be caught on the flange by manual pressure upon the body.

2. A dish for containing and displaying a food product comprising a dish body and a cover therefor, both the body and the cover being made from a resilient comparatively thin material and having the body portion provided at its rim with a flange and the cover with an edge-turned portion, the said edge-turned portion being provided with a plurality of flange-extension spaces thereupon and adapted to be caught on the flange by manual pressure of the body.

3. A dish for containing and displaying a food product comprising a dish body and a cover therefor, both made from a relatively thin resilient material and having the body portion provided at its rim with a flange and the cover with a flange-engaging portion, the said flange-engaging portion being provided with a plurality of flange-extension spaces thereupon and adapted to be engaged with the flange by manual pressure of the body.

GEORGE S. STANLEY.